(12) United States Patent
Bures et al.

(10) Patent No.: US 9,804,290 B2
(45) Date of Patent: Oct. 31, 2017

(54) CROSS-CORRELATED GAMMA RAY AND NEUTRON DETECTOR

(71) Applicant: Morpho Detection, LLC, Newark, CA (US)

(72) Inventors: Brian Lee Bures, Pelham, NH (US); Samit Kumar Basu, Fremont, CA (US)

(73) Assignee: Morpho Detection, LLC, Newark, CA (US)

( * ) Notice: Subject to any disclaimer, the term of this patent is extended or adjusted under 35 U.S.C. 154(b) by 1093 days.

(21) Appl. No.: 14/228,917

(22) Filed: Mar. 28, 2014

(65) Prior Publication Data
US 2016/0370493 A1 Dec. 22, 2016

Related U.S. Application Data

(60) Provisional application No. 61/807,367, filed on Apr. 2, 2013.

(51) Int. Cl.
*G01V 5/00* (2006.01)
*G01T 3/06* (2006.01)
*G01T 3/08* (2006.01)

(52) U.S. Cl.
CPC .............. *G01V 5/0075* (2013.01); *G01T 3/06* (2013.01); *G01T 3/08* (2013.01)

(58) Field of Classification Search
CPC ................................. G01V 5/0075; G01T 3/06
See application file for complete search history.

(56) References Cited

U.S. PATENT DOCUMENTS 3,413,472 A * 11/1968 Caldwell ................ G01V 5/104
                                                               250/265
4,503,328 A * 3/1985 Neufeld .................... G01V 3/30
                                                               250/262

(Continued)

FOREIGN PATENT DOCUMENTS

| CN | 201662623 U | 12/2010 |
|----|-------------|---------|
| EP | 2071359 A2 | 6/2009 |
| WO | 2004109331 A2 | 12/2004 |

OTHER PUBLICATIONS

G.F. Knoll, "Slow Neutron Detection Methods", Chapter 14, Radiation Detection and Measurement 2nd Ed. John Wiley & Sons, 1989, pp. 481-511.

(Continued)

*Primary Examiner* — Christine Sung
(74) *Attorney, Agent, or Firm* — Armstrong Teasdale LLP

(57) ABSTRACT

A radiation detector is provided. The radiation detector includes an outer casing, at least one first detector disposed within said outer casing, the at least one first detector configured to primarily detect gamma ray radiation, at least one second detector disposed within the outer casing, the at least one second detector configured to primarily detect neutron radiation, and a computing device disposed within the outer casing and communicatively coupled to the at least one first detector and the at least one second detector. The computing device is configured to receive first data from the at least one first detector, receive second data from the at least one second detector, determine a number of neutrons and gamma rays detected based on the first and second data, and determine a detected energy spectrum based on the first and second data.

20 Claims, 3 Drawing Sheets

(56) References Cited

U.S. PATENT DOCUMENTS

| | | | | |
|---|---|---|---|---|
| 4,992,872 | A * | 2/1991 | Hartmann | H04N 5/45 348/516 |
| 5,347,129 | A * | 9/1994 | Miller | G01T 1/17 250/336.1 |
| 5,473,158 | A * | 12/1995 | Holenka | E21B 47/024 250/254 |
| 8,389,941 | B2 | 3/2013 | Bendahan et al. | |
| 8,624,195 | B2 | 1/2014 | Nelson | |
| 8,642,972 | B2 | 2/2014 | Fukuda et al. | |
| 2005/0121618 | A1 | 6/2005 | Fowler et al. | |
| 2005/0275545 | A1 * | 12/2005 | Alioto | B66C 19/002 340/600 |
| 2007/0211248 | A1 * | 9/2007 | Caulfield | G06K 9/0053 356/301 |
| 2007/0272874 | A1 * | 11/2007 | Grodzins | G01T 1/2018 250/390.11 |
| 2010/0181488 | A1 * | 7/2010 | Pausch | G01T 3/08 250/369 |
| 2012/0061580 | A1 | 3/2012 | Kline et al. | |
| 2012/0181435 | A1 * | 7/2012 | Dioszegi | G01T 1/2985 250/362 |
| 2012/0326043 | A1 * | 12/2012 | Duraj | G01T 3/06 250/362 |
| 2013/0161519 | A1 | 6/2013 | Ishizu et al. | |
| 2013/0168566 | A1 | 7/2013 | Blackburn et al. | |
| 2013/0181137 | A1 | 7/2013 | Watanabe et al. | |
| 2013/0206972 | A1 | 8/2013 | Zhou et al. | |
| 2014/0042330 | A1 * | 2/2014 | Gozani | G01T 1/203 250/367 |
| 2015/0060686 | A1 * | 3/2015 | DeVolpi | G01T 3/00 250/390.1 |
| 2015/0316662 | A1 * | 11/2015 | Rhiger | G01T 1/241 250/370.05 |
| 2016/0146953 | A1 * | 5/2016 | Stowe | G01T 1/361 250/370.05 |
| 2016/0291196 | A1 * | 10/2016 | De Vita | G01T 1/20 |

OTHER PUBLICATIONS

Extended European Search Report dated Jul. 1, 2014 for Morpho Detection, LLC Application No. EP14001212.1-1559, 6 pages.

* cited by examiner

CROSS-CORRELATED GAMMA RAY AND NEUTRON DETECTOR

CROSS REFERENCE TO RELATED APPLICATIONS

This application is a non-provisional application and claims priority to U.S. Provisional Patent Application Ser. No. 61/807,367 filed Apr. 2, 2013 for "CROSS-CORRELATED GAMMA RAY AND NEUTRON DETECTOR", which is hereby incorporated by reference in its entirety.

BACKGROUND

The embodiments described herein relate generally to detecting radiation, and more particularly, to a radiation detector for detecting gamma ray and neutron radiation simultaneously.

At least some known passenger screening systems detect contraband. As used herein, the term "contraband" refers to illegal substances, explosives, narcotics, weapons, a threat object, and/or any other material that a person is not allowed to possess in a restricted area, such as an airport. Contraband detection may involve a combination of sensors and structures to control a flow of passengers and/or cargo. Although passengers are referred to herein, any person and/or object (i.e., subject) may be scanned for contraband using the systems and methods described herein. Contraband may also include objects that can be carried in exempt or licensed quantities intended to be used outside of safe operational practices, such as the construction of dispersive radiation devices.

One apparatus for detecting contraband is a radiation detector. Radiation detectors may detect neutron and/or gamma ray radiation to identify one or more radionuclides in a radiation source. Moreover, at least some known radiation detectors are hand-held, allowing for portable detection. In general, the larger the detector volume, the more quickly source radionuclides may be identified. However, for at least some known radiation detectors, it may be difficult to increase detector volume while maintaining portability.

BRIEF SUMMARY

In one aspect, a radiation detector is provided. The radiation detector includes an outer casing, at least one first detector disposed within said outer casing, the at least one first detector configured to primarily detect gamma ray radiation, at least one second detector disposed within the outer casing, the at least one second detector configured to primarily detect neutron radiation, and a computing device disposed within the outer casing and communicatively coupled to the at least one first detector and the at least one second detector. The computing device is configured to receive first data from the at least one first detector, receive second data from the at least one second detector, determine a number of neutrons and gamma rays detected based on the first and second data, and determine a detected energy spectrum based on the first and second data.

In another aspect, a method for detecting radiation is provided. The method includes receiving, at a radiation detector, radiation from a radiation source, wherein the radiation detector includes an outer casing, at least one first detector configured to primarily detect gamma rays, and at least one second detector configured to primarily detect neutrons. The method further includes detecting at least one of neutrons and gamma rays in the radiation using the at least one first detector, detecting at least one of neutrons and gamma rays in the radiation using the at least one second detector, receiving, at a computing device communicatively coupled to the at least one first detector and the at least one second detector, data from the at least one first detector and the at least one second detector, and determining, using the computing device, a detected energy spectrum and a number of neutrons and gamma rays detected based on the received data.

In yet another aspect, a method for detecting radiation using a radiation detector that includes a computing device is provided. The method includes receiving, at the computing device, first data from at least one first detector that is configured to primarily detect gamma rays, receiving, at the computing device, second data from at least one second detector that is configured to primarily detect neutrons, determining, using the computing device, a number of neutrons and gamma rays detected based on the first and second data, and determining, using the computing device, a detected energy spectrum based on the first and second data.

DETAILED DESCRIPTION

The systems and methods described herein enable simultaneously detecting neutron and gamma ray radiation using a radiation detector. The radiation detector includes a first detector configured to primarily detect gamma rays and a second detector configured to primarily detect neutrons. An outer casing of the radiation detector is altered such that at least a portion of neutrons passing through the outer casing are converted into gamma rays. A computing device coupled to the first and second detectors cross-correlates the detections from the first and second detectors.

Figure 1:
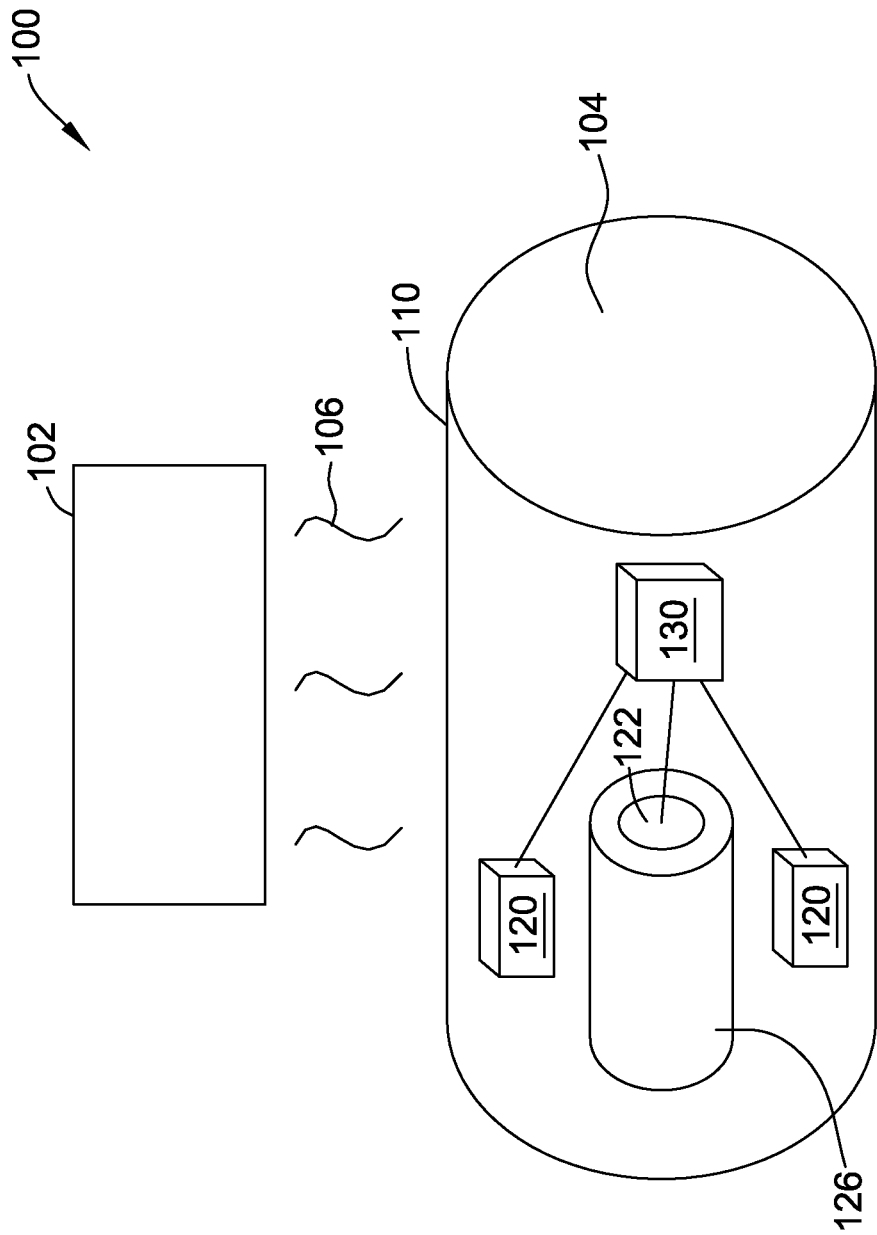
FIG. 1 is a schematic diagram of an exemplary radiation detector.

FIG. 1 is a schematic diagram of an exemplary radiation detection system 100 that includes a radiation source 102 and a radiation detector 104. Radiation source 102 emits radiation 106 that is detectable by radiation detector 104. In the exemplary embodiment, radiation 106 includes neutrons and gamma rays (i.e., photons). Alternatively, radiation 106 may include any particles detectable by radiation detector 104. In some embodiments, radiation detector 104 includes imaging capabilities for determining a location of radiation source 102. Radiation detector 104 facilitates identifying one or more source radionuclides in radiation source 102. Accordingly, radiation detector 104 may be utilized for various security applications (e.g., airport security, police investigations, border patrol, threat assessment, etc.).

Radiation detector 104 includes a casing 110 and a plurality of components disposed therein, as described in detail herein. In the exemplary embodiment, casing 110 is shaped and sized such that radiation detector 104 is operable as a portable, hand-held device. For example, in one embodiment, radiation detector 104 weighs less than 3 pounds (lb) and has dimensions of approximately 15 inches (in.) by 4 in. by 3 in. Alternatively, casing 110 may have any shape and/or dimensions that enable radiation detector 104 to function as described herein.

Casing 110 is composed of a base material modified with a transducer material that is mixed into the base material or applied as a coating on an internal or external surface of the base material. In the exemplary embodiment, casing 110 is a plastic (e.g., high-density polyethylene (HDPE)) doped with Boron. Alternatively, casing 110 may have any composition that enables radiation detector 104 to function as described herein. As radiation 106 passes through casing 110, the Boron doping converts a portion of the neutrons in radiation 106 into gamma rays. More specifically, casing 110 converts a portion of the neutrons into gamma rays having an energy of 477 kilo-electron volts (keV) in one embodiment. Other components of radiation detector 104 (e.g., a battery (not shown)) may be similarly altered to facilitate conversion of neutrons to gamma rays without impacting the primary function of those components.

To detect neutrons and gamma rays in radiation 106, radiation detector 104 includes at least one first detector 120 and at least one second detector 122. As used herein, detecting a neutron or gamma ray refers to registering an incidence (i.e., a count) of the particle and an energy of the particle. First detector 120 primarily detects gamma rays, and second detector 122 primarily detects neutrons, as described herein. Although two first detectors 120 and one second detector 122 are shown in FIG. 1, radiation detector 104 may include any number of first detectors 120 and second detectors 122 that enables radiation detector 104 to function as described herein. For example in some embodiments, radiation detector 104 includes six, twelve, or thirty-six first detectors 120. In some embodiments, the configuration of radiation detector 104 may allow for improved directionality detection of low energy gamma rays that have not undergone Compton scattering.

In the exemplary embodiment, each first detector 120 is a cadmium zinc telluride (CdZnTe) crystal, referred to herein as a CZT detector. Alternatively, first detector 120 may be another type of detector that primarily detects gamma rays. For example, first detector 120 may include a sodium iodide detector, a lanthanum bromide detector, or other gamma detectors. First detectors 120 are positioned within casing 110 to facilitate optimizing absorption of gamma rays (e.g., 477 keV gamma rays generated by converting neutrons with doped casing 110).

First detector 120 has a relatively high resolution for gamma rays in radiation 106 (e.g., less than 2% full width half maximum (FWHM) at 662 keV). In addition to gamma rays, first detector 120 may also detect a relatively low number of neutrons from radiation 106. In the exemplary embodiment, each first detector 120 has dimensions of approximately 15 millimeters (mm) by 15 mm by 10 mm. Alternatively, first detector 120 may have any dimensions that enable first detector 120 to function as described herein. For example, if a thickness of each CZT detector is halved, the number of first detectors 120 in casing 110 may be doubled.

In the exemplary embodiment, second detector 122 detects neutrons. More specifically, second detector 122 is a $Cs_2LiYCl_6$:Ce detector, referred to herein as a CLYC detector. Alternatively, second detector 122 may be another type of detector that primarily detects neutrons. For example, second detector 120 may include elpasolite or plastic scintillators.

Second detector 122 is surrounded by a neutron moderator 126 that slows down fast neutrons in radiation 106 into more easily detectable neutrons. Neutron moderator 126 is a plastic (e.g., high-density polyethylene (HDPE)) in the exemplary embodiment. Similar to casing 110, neutron moderator 126 may be doped (e.g., using Boron) to convert neutrons into gamma rays.

In the exemplary embodiment, second detector 122 detects neutrons. Second detector 122 may also detect gamma rays (e.g., 477 keV gamma rays generated by converting neutrons with neutron moderator 126). In the exemplary embodiment, second detector 122 has a resolution of approximately 4% FWHM at 662 keV. Second detector 122 discriminates between neutrons and gamma rays using pulse height and/or pulse shape discrimination. For example, in one embodiment, particles with a pulse height greater than 3 mega-electron volts (MeV) are classified as neutrons, and particles with a pulse height less than 3 MeV are classified as gamma rays.

First and second detectors 120 and 122 are communicatively coupled to a computing device 130 in the exemplary embodiment. Computing device 130 is located within casing 110, and cross-correlates the neutron and gamma ray detections from first and second detectors 120 and 122, as described herein.

Figure 2:
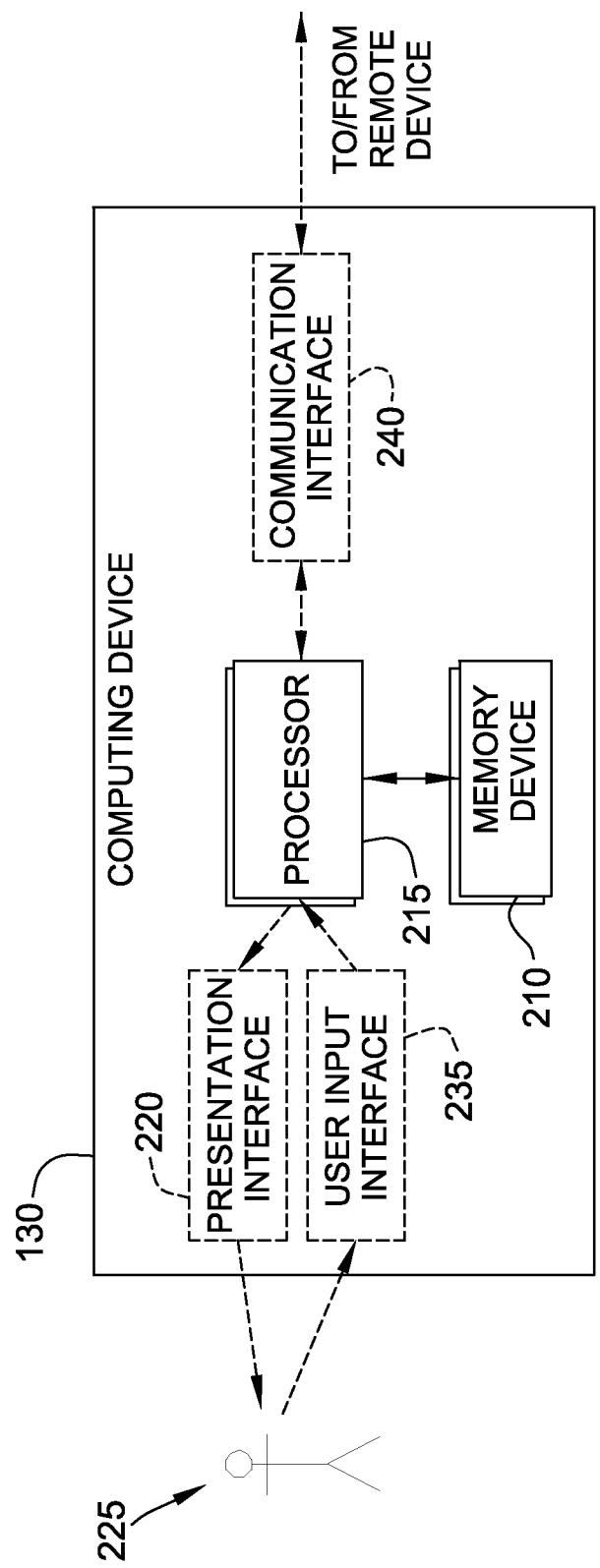
FIG. 2 is a block diagram of an exemplary computing device that may be used with the radiation detector shown in FIG. 1.

FIG. 2 is a block diagram of computing device 130 that may be used with radiation detection system (shown in FIG. 1). Computing device 130 includes at least one memory device 210 and a processor 215 that is coupled to memory device 210 for executing instructions. In some embodiments, executable instructions are stored in memory device 210. In the exemplary embodiment, computing device 130 performs one or more operations described herein by programming processor 215. For example, processor 215 may be programmed by encoding an operation as one or more executable instructions and by providing the executable instructions in memory device 210.

Processor 215 may include one or more processing units (e.g., in a multi-core configuration). Further, processor 215 may be implemented using one or more heterogeneous processor systems in which a main processor is present with secondary processors on a single chip. In another illustrative example, processor 215 may be a symmetric multi-processor system containing multiple processors of the same type. Further, processor 215 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. In the exemplary embodiment, processor 215 cross-correlates data from first and second detectors 120 and 122 (both shown in FIG. 1) to determine the number and energies of neutrons and gamma rays detected by radiation detector 104.

In the exemplary embodiment, memory device 210 is one or more devices that enable information such as executable instructions and/or other data to be stored and retrieved. Memory device 210 may include one or more computer readable media, such as, without limitation, dynamic random access memory (DRAM), static random access memory (SRAM), a solid state disk, and/or a hard disk. Memory device 210 may be configured to store, without limitation, application source code, application object code, source code portions of interest, object code portions of interest, configuration data, execution events and/or any other type of data.

In the exemplary embodiment, computing device 130 includes a presentation interface 220 that is coupled to processor 215. Presentation interface 220 presents information to a user 225. For example, presentation interface 220 may include a display adapter (not shown) that may be coupled to a display device, such as a cathode ray tube (CRT), a liquid crystal display (LCD), an organic LED (OLED) display, and/or an "electronic ink" display. In some embodiments, presentation interface 220 includes one or more display devices.

In the exemplary embodiment, computing device 130 includes a user input interface 235. User input interface 235 is coupled to processor 215 and receives input from user 225. User input interface 235 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 220 and user input interface 235.

Computing device 130, in the exemplary embodiment, includes a communication interface 240 coupled to processor 215. Communication interface 240 communicates with one or more remote devices. To communicate with remote devices, communication interface 240 may include, for example, a wired network adapter, a wireless network adapter, and/or a mobile telecommunications adapter.

In the exemplary embodiment, processor 215 cross-correlates data from first and second detectors 120 and 122. More specifically, processor 215 combines the number and energies of neutrons and gamma rays detected by first detectors 120 and the number and energies of neutrons and gamma rays detected by second detector 122 to calculate a total number of neutrons and gamma rays detected, as well as a total energy spectrum detected. The number of neutrons detected, number of gamma rays detected, and/or energy spectrum may be displayed, for example, on presentation interface 220.

To identify one or more source radionuclides in radiation source 102, processor 215 compares the detected energy spectrum with a reference library including a plurality of reference spectra. The reference library may be stored, for example, in memory device 210. In some embodiments, if certain radionuclides are identified using radiation detector 104, processor 215 generates an alarm to alert user 225. The alarm may include any audio and/or visual indication that facilitates alerting user 225. Identified radionuclides and/or alarms may be displayed, for example, on presentation interface 220.

Because computing device 130 cross-correlates detections for first and second detectors 120 and 122, to facilitate improving detection, different detectors may be optimized for different portions of the energy spectrum. That is, second detector 122 may be designed for improved efficiency in a portion of the energy spectrum in which first detector 120 is less efficient. For example, relative to first detector 120, second detector 122 may be a larger detector such that second detector has a higher efficiency at detecting high energy gamma rays. Accordingly, the sizes and/or orientations of first and second detectors 120 and 122 may be modified to improve detection capabilities of radiation detector 104.

Figure 3:
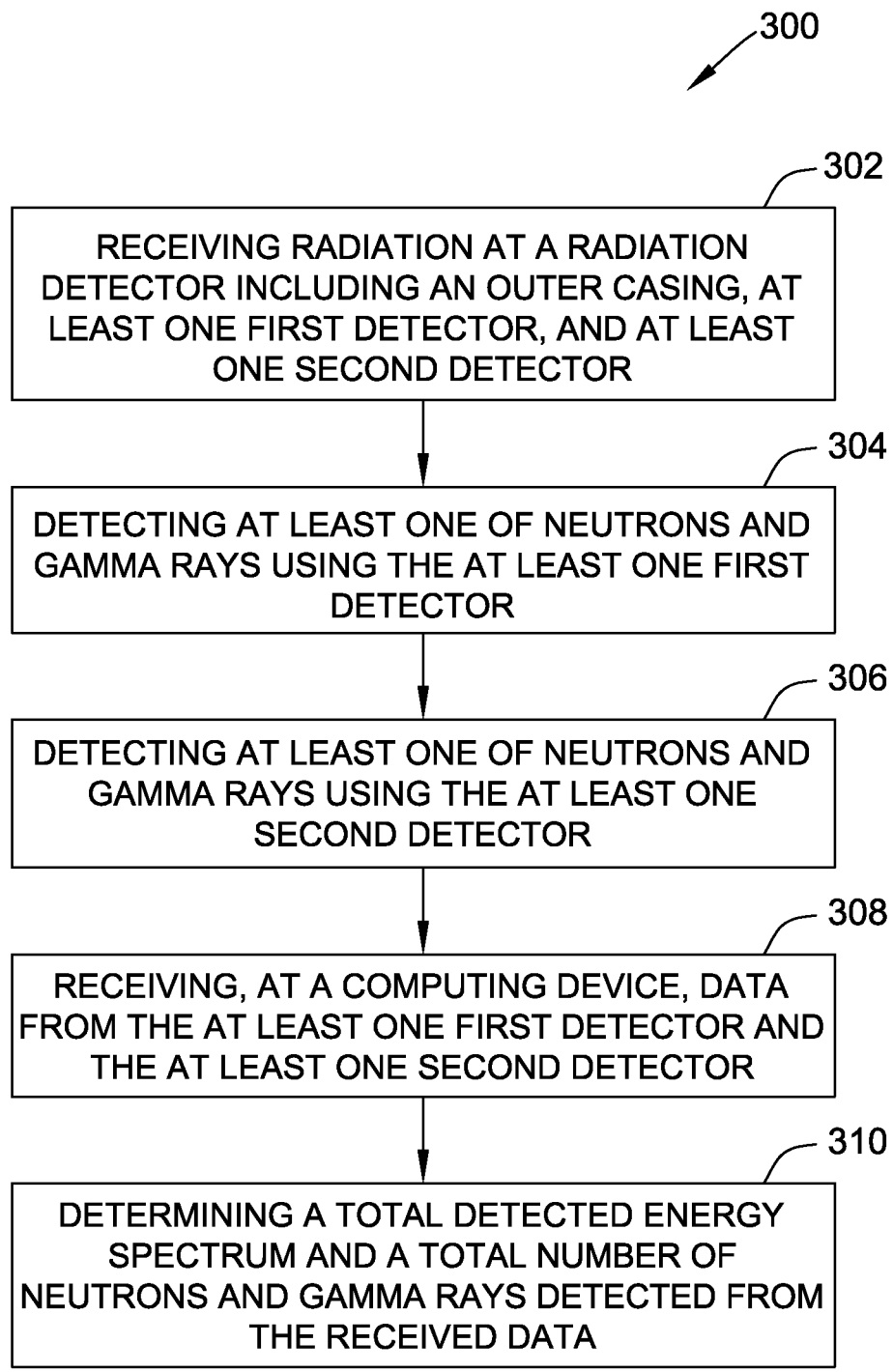
FIG. 3 is a flowchart of an exemplary method for detecting radiation.

FIG. 3 is a flowchart of an exemplary method 300 for detecting radiation. Method 300 includes receiving 302 radiation at a radiation detector, such as radiation detector 104 (shown in FIG. 1). The radiation detector includes an outer casing, such as outer casing 110 (shown in FIG. 1), at least one first detector, such as first detector 120 (shown in FIG. 1), and at least one second detector, such as second detector 122 (shown in FIG. 1). The at least one first detector is configured to primarily detect gamma rays, and the at least one second detector is configured to primarily detect neutrons.

The first detector detects 304 at least one of neutrons and gamma rays in the radiation, and the second detector detects 306 at least one of neutrons and gamma rays in the radiation. A computing device, such as computing device 130 (shown in FIGS. 1 and 2), receives 308 data from the first and second detectors. From the received data, the computing device determines 310 a detected energy spectrum and a number of neutrons and gamma rays detected.

Using the systems and methods described herein, a handheld radiation detector includes detection devices for both neutrons and gamma rays, optimizing the detection ability of the radiation detector without substantially increasing the mass and/or form factor. A computing device within the radiation detector receives data from the detection devices to determine an amount and energy of detected radiation. By cross-correlating data from the detection devices, as compared to at least some known radiation detectors, the radiation detector described herein facilitates detecting additional particles, improving a count rate and accuracy of a detected energy spectrum. Further, the outer casing of the radiation detector is doped to facilitate converting neutrons into readily detectable gamma rays. Accordingly, the systems and methods described herein facilitate maximizing a detectable volume while maintaining a relatively small overall size of the radiation detector.

The systems and methods described herein may be used to detect contraband. As used herein, the term "contraband" refers to illegal substances, explosives, narcotics, weapons, special nuclear materials, dirty bombs, nuclear threat materials, a threat object, and/or any other material that a person is not allowed to possess in a restricted area, such as an airport. Contraband may be hidden within a subject (e.g., in a body cavity of a subject) and/or on a subject (e.g., under the clothing of a subject). Contraband may also include objects that can be carried in exempt or licensed quantities intended to be used outside of safe operational practices, such as the construction of dispersive radiation devices.

A computer, such as those described herein, includes at least one processor or processing unit and a system memory. The computer typically has at least some form of computer readable media. By way of example and not limitation, computer readable media include computer storage media and communication media. Computer storage media include volatile and nonvolatile, removable and nonremovable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Exemplary embodiments of methods and systems for detecting radiation are described above in detail. The methods and systems are not limited to the specific embodiments described herein, but rather, components of systems and/or steps of the methods may be utilized independently and separately from other components and/or steps described herein. Accordingly, the exemplary embodiment can be implemented and utilized in connection with many other applications not specifically described herein.

Technical effects of the systems and methods described herein include at least one of a) receiving first data from at least one first detector that is configured to primarily detect gamma rays; b) receiving second data from at least one second detector that is configured to primarily detect neutrons; c) determining a number of neutrons and gamma rays detected based on the first and second data; and d) determining a detected energy spectrum based on the first and second data.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A radiation detector comprising:
    an outer casing;
    at least one first detector disposed within said outer casing, said at least one first detector configured to primarily detect gamma ray radiation;
    at least one second detector disposed within said outer casing, said at least one second detector configured to primarily detect neutron radiation; and
    a computing device disposed within said outer casing and communicatively coupled to said at least one first detector and said at least one second detector, said computing device configured to:
        receive first data from said at least one first detector;
        receive second data from said at least one second detector;
        combine the first and second data;
        determine a number of neutrons and gamma rays detected based on the combined first and second data; and
        determine a total detected energy spectrum based on the combined first and second data.

2. A radiation detector in accordance with claim 1, wherein said at least one first detector is a CZT detector.

3. A radiation detector in accordance with claim 1, wherein said at least one second detector is a CLYC detector.

4. A radiation detector in accordance with claim 1, wherein said outer casing is doped with Boron such that at least a portion of neutrons passing through said outer casing are converted into gamma rays.

5. A radiation detector in accordance with claim 1, further comprising a neutron moderator surrounding said at least one second detector.

6. A radiation detector in accordance with claim 1, wherein said at least one first detector comprises a plurality of first detectors.

7. A radiation detector in accordance with claim 1, wherein said radiation detector is a portable, hand-held device.

8. A method for detecting radiation, said method comprising:
    receiving, at a radiation detector, radiation from a radiation source, wherein the radiation detector includes an outer casing, at least one first detector configured to primarily detect gamma rays, and at least one second detector configured to primarily detect neutrons;
    detecting at least one of neutrons and gamma rays in the radiation using the at least one first detector;
    detecting at least one of neutrons and gamma rays in the radiation using the at least one second detector;
    receiving, at a computing device communicatively coupled to the at least one first detector and the at least one second detector, data from the at least one first detector and the at least one second detector;
    combining the data from the at least one first detector and the at least one second detector; and
    determining, using the computing device, a total detected energy spectrum and a number of neutrons and gamma rays detected based on the combined data.

9. A method in accordance with claim 8, further comprising converting, using a doping agent in the outer casing, at least a portion of the neutrons in the radiation into gamma rays.

10. A method in accordance with claim 8, wherein detecting at least one of neutrons and gamma rays using the at least one first detector comprises detecting using a CZT detector.

11. A method in accordance with claim 8, wherein detecting at least one of neutrons and gamma rays using the at least one second detector comprises detecting using a CLYC detector.

12. A method in accordance with claim 8, wherein receiving radiation comprises receiving radiation at a portable, hand-held radiation detector.

13. A method in accordance with claim 8, wherein receiving radiation comprises receiving radiation at a radiation detector that includes a plurality of first detectors.

14. A method in accordance with claim 8, wherein receiving radiation comprises receiving radiation at a radiation detector that further includes a neutron moderator surrounding the at least one second detector.

15. A method for detecting radiation using a radiation detector that includes a computing device, the method comprising:
    receiving, at the computing device, first data from at least one first detector that is configured to primarily detect gamma rays;
    receiving, at the computing device, second data from at least one second detector that is configured to primarily detect neutrons;
    combining, using the computing device, the first and second data;
    determining, using the computing device, a number of neutrons and gamma rays detected based on the combined first and second data; and
    determining, using the computing device, a total detected energy spectrum based on the combined first and second data.

16. A method in accordance with claim 15, wherein receiving first data comprises receiving first data from at least one CZT detector.

17. A method in accordance with claim 15, wherein receiving second data comprises receiving second data from at least one CLYC detector.

18. A method in accordance with claim 15, wherein receiving first data comprises receiving first data from a plurality of first detectors.

19. A method in accordance with claim 15, further comprising identifying, using the computing device, at least one radionuclide based on the detected energy spectrum.

20. A method in accordance with claim 19, further comprising generating an alarm when a predetermined radionuclide is identified.

\* \* \* \* \*